(12) United States Patent
Hannon et al.

(10) Patent No.: US 11,796,039 B2
(45) Date of Patent: Oct. 24, 2023

(54) ELECTRIC DRIVELINE AND METHOD OF OPERATING AN ELECTRIC DRIVELINE

(71) Applicant: Dana Belgium N.V., Bruges (BE)

(72) Inventors: Bert Hannon, Bruges (BE); Joachim Van Dingenen, Drongen (BE); Kurt Cattoor, Koolkerke (BE); Jessica Versini, Bruges (BE)

(73) Assignee: Dana Belgium N.V., Brugge (DE)

( * ) Notice: Subject to any disclaimer, the term of this patent is extended or adjusted under 35 U.S.C. 154(b) by 3 days.

(21) Appl. No.: 17/538,966

(22) Filed: Nov. 30, 2021

(65) Prior Publication Data

US 2022/0170534 A1 Jun. 2, 2022

(30) Foreign Application Priority Data

Dec. 1, 2020 (DE) ...................... 10 2020 215 133.4

(51) Int. Cl.
*F16H 3/72* (2006.01)
*F16H 3/00* (2006.01)

(52) U.S. Cl.
CPC ............ *F16H 3/727* (2013.01); *F16H 3/006* (2013.01); *F16H 2200/0004* (2013.01); *F16H 2200/0021* (2013.01); *F16H 2200/0034* (2013.01); *F16H 2200/201* (2013.01)

(58) Field of Classification Search
CPC ...................... B60K 1/02; B60K 17/12; F16H 2200/2005–201; F16H 2200/0004; F16H 37/08–2037/108
See application file for complete search history.

(56) References Cited

U.S. PATENT DOCUMENTS

| 6,090,005 | A  | * | 7/2000  | Schmidt | B60K 6/445 475/5 |
| 7,154,236 | B1 | * | 12/2006 | Heap    | B60W 20/11 180/65.265 |
| 10,328,785 | B2 | * | 6/2019  | Lee     | B60K 6/48 |
| 2002/0088291 | A1 | * | 7/2002  | Bowen   | B60W 10/119 903/917 |
| 2004/0242368 | A1 | * | 12/2004 | Tabata  | F16H 3/666 475/296 |

(Continued)

FOREIGN PATENT DOCUMENTS

| DE | 102012204717 A1 | * | 9/2013 | ............. B60K 1/02 |
| DE | 102017004681 A1 | * | 11/2017 | ............. B60K 17/28 |

*Primary Examiner* — Ernesto A Suarez
*Assistant Examiner* — Lillian T Nguyen
(74) *Attorney, Agent, or Firm* — McCoy Russell LLP

(57) ABSTRACT

An electric driveline, comprising at least a first and a second electric machine, at least a first and a second output, and at least a first planetary gear set including three drivingly connected components including a sun gear, a planetary carrier and a ring gear. The first and the second electric machine are drivingly connected or connectable with the first and the second output via the first planetary gear set. At least one of the first and the second electric machine is selectively connected with the same one of the three components of the first planetary gear set via at least two different gear ratios, and/or the same one of the three components of the first planetary gear set is selectively connected with each of the first and the second output via at least two different gear ratios. The disclosure further concerns a method of operating an electric driveline.

11 Claims, 2 Drawing Sheets

(56) References Cited

U.S. PATENT DOCUMENTS

| | | | | |
|---|---|---|---|---|
| 2015/0105204 A1* | 4/2015 | Kim | ................... | F16H 37/046 |
| | | | | 180/65.265 |
| 2015/0167806 A1* | 6/2015 | Lee | ................... | F16H 61/0403 |
| | | | | 180/65.23 |
| 2015/0283894 A1* | 10/2015 | Morrow | ................ | F16H 37/065 |
| | | | | 475/5 |
| 2016/0167503 A1* | 6/2016 | Lee | ................ | B60K 6/387 |
| | | | | 903/910 |
| 2019/0337376 A1* | 11/2019 | Ore | ................ | B60K 6/365 |

\* cited by examiner

ELECTRIC DRIVELINE AND METHOD OF OPERATING AN ELECTRIC DRIVELINE

CROSS-REFERENCE TO RELATED APPLICATION

The present application claims priority to German Patent Application No. 10 2020 215 133.4 entitled "ELECTRIC DRIVELINE AND METHOD OF OPERATING AN ELECTRIC DRIVELINE", and filed on Dec. 1, 2020. The entire contents of the above-listed application is hereby incorporated by reference for all purposes.

TECHNICAL FIELD

The disclosure concerns an electric driveline, such as an electric driveline for an electric vehicle, as well as a method of operating an electric driveline.

BACKGROUND AND SUMMARY

Electric vehicles, electric drivelines, and methods of operating such drivelines are known in the art. For instance, an electric vehicle may comprise one or more electric machines (providing electric power inputs) and one or more mechanical power outputs. In this situation, an electric driveline provides power distribution between the electric inputs and the electric outputs.

An electric driveline of this type may allow the electric machines to operate with high efficiency, at respective optimal operational points, and avoid, for instance, zero-rpm (revolutions per minute) operation of the electric machines during vehicle stall conditions. Furthermore, there is a requirement for such an electric driveline to be compact and cost-efficient and allow for flexible operation under various conditions.

Accordingly, an object of the present disclosure is to propose an electric driveline and a method of operating an electric driveline with some or all of the aforementioned properties.

The proposed electric driveline comprises at least a first and a second electric machine, at least a first and a second output, and at least a first planetary gear set including three drivingly connected components including a sun gear, a planetary carrier and a ring gear.

The first and the second electric machine are drivingly connected or connectable with the first and the second output via the first planetary gear set.

At least one of the first and the second electric machine is selectively drivingly connected or drivingly connectable with the same one of the three components of the first planetary gear set via at least two different gear ratios, and/or the same one of the three components of the first planetary gear set is selectively drivingly connected or drivingly connectable with each of the first and the second output via at least two different gear ratios.

The first and second electric machines being connected with the first and second output via the planetary gear in the proposed way enables a compact and cost-efficient design of the electric driveline as well as flexible operation of the electric driveline under various conditions.

For instance, the power distribution realized by the proposed electric driveline comprising the first planetary gear does not impose a fixed ratio between the inputs (electric machines) and the outputs and allows for arbitrarily high gear reduction or provides an infinitely variable transmission.

For instance, it is thereby possible for the electric machines to operate at high efficiency (at their respective optimal operational points). Furthermore, zero-rpm operation of the electric machines may be avoided.

Furthermore, since at least one of the first and the second electric machine and/or each of the first and second output is selectively drivingly connected or connectable with the first planetary gear set via at least two different gear ratios, flexible gear-shifting and/or power distribution functionality may be provided on the input (electric machine) side and/or on the output side of the planetary gear set.

In some embodiments, both the first and second electric machine are connected with and provide torque to a respective component of the first planetary gear set in order for torque to be transmitted to the first and second output via the first planetary gear set.

The electric driveline may comprise one or more dog clutches and/or wet clutches and/or synchronizers configured to selectively drivingly connect the first and/or the second electric machine and/or the first and/or second output with the first planetary gear set via at least two different gear ratios.

If only one of the first and the second electric machine is selectively drivingly connected or drivingly connectable with the first planetary gear set via at least two different gear ratios, the remaining one of the first and the second electric machine may be coupled—such as to be configured to transmit torque—to the planetary gear set directly or via one or more fixed gear ratios.

The electric machines may be electric machines of an electric vehicle, such as an electric road vehicle or off-road vehicle or boat. Each or any of the outputs may be or include, for instance, part of the vehicle's tractive driveline and/or one or several mechanical power take-offs (PTOs).

The planetary carrier of the first planetary gear set may comprise or be connected to one planetary gear or, for instance, a plurality of planetary gears meshing with the sun gear and the ring gear.

Each of the first and the second electric machine may be drivingly connected or drivingly connectable with a different one of the three components of the first planetary gear set. In this case, each of the first and the second output may be drivingly connected or drivingly connectable with the remaining one of the three components of the first planetary gear set. In this way, power supplied by each of the first and second electric machine may be combined to drive the first and/or second output and/or power supplied by the first and/or second output may be distributed to the first and/or second electric machine.

Each of the first and the second electric machine may be drivingly connected or drivingly connectable with the first planetary gear set via at least two different gear ratios. Flexible gear-shifting and/or power distribution functionality on the input side may thus be provided.

The first and the second output may be drivingly connected or drivingly connectable with an output of the first planetary gear set. The output of the first planetary gear set may include the sun gear, the planetary carrier or the ring gear of the first planetary gear set.

The first planetary gear set may be drivingly connected or drivingly connectable with the first and the second output via a second planetary gear set. Flexible gear-shifting and/or power distribution functionality may thus be provided on the output side.

The second planetary gear set may include a sun gear, a planetary carrier and a ring gear. The first output and the second output may each be drivingly connected with different ones of the sun gear, the planetary carrier and ring gear of the second planetary gear set. The second planetary gear set may thus enable differentially driving the first and second output or. it may act, for instance, as a planetary gear inter-axle differential (IAD).

The second planetary gear set may comprise a locking mechanism. Different driving situations, such as situations with varying traction and/or ground conditions, may thus be accommodated.

The first and second output may be connected via a bevel gear IAD and/or a front-axle disconnect and/or a rear-axle disconnect. The bevel gear IAD may comprise a locking mechanism.

The electric driveline further comprise a mechanical power take-off drivingly connected or selectively drivingly connected with one of the first and the second electric machine.

The electric driveline may comprise a front drive axle and a rear drive axle. The front drive axle may be drivingly connected or selectively drivingly connected with the first and/or second output. The rear drive axle may be drivingly connected or selectively drivingly connected with the first and/or second output.

The electric driveline may comprise an energy storage device electrically connected with the first electric machine and/or with the second electric machine. The first electric machine and/or the second electric machine may be configured to selectively operate as either one of an electric motor and an electric generator. In this way, the electric driveline may provide regeneration of energy stored in the energy storage device, for example by regenerative braking.

The proposed method of operating an electric driveline comprises transmitting torque from a first electric machine and from a second electric machine to a first mechanical output and to a second mechanical output via a first planetary gear set, the first planetary gear set including three drivingly connected components including a sun gear, a planetary carrier and a ring gear.

Torque from at least one of the first electric machine and the second electric machine is selectively transmitted to one of the three components of the first planetary gear set via one of at least two selectively engageable gear ratios, and/or torque from the first planetary gear set is selectively transmitted to each of the first mechanical output and to the second mechanical output via one of at least two selectively engageable gear ratios.

If torque from only one of the first and the second electric machine is selectively transmitted to the first planetary gear set via one of at least two different gear ratios, torque from the remaining one of the first and the second electric machine may be transmitted to the planetary gear set directly or via one or more fixed gear ratios.

Torque from at least one of the first mechanical output and the second mechanical output may be transmitted to the first electric machine and the second electric machine via the planetary gear set.

Operating an electric driveline by way of the proposed method benefits from the same advantages considered above in connection with the proposed electric driveline. Accordingly, the method may further comprise steps or aspects corresponding to the features of the electric driveline in various embodiments.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the proposed electric driveline and method, will become apparent to those skilled in the art from the following detailed description of exemplary embodiments when considered in the light of the accompanying schematic drawings, in which.

Recurring and similar features in the drawings are provided with identical reference numerals.

DETAILED DESCRIPTION

Figure 1:
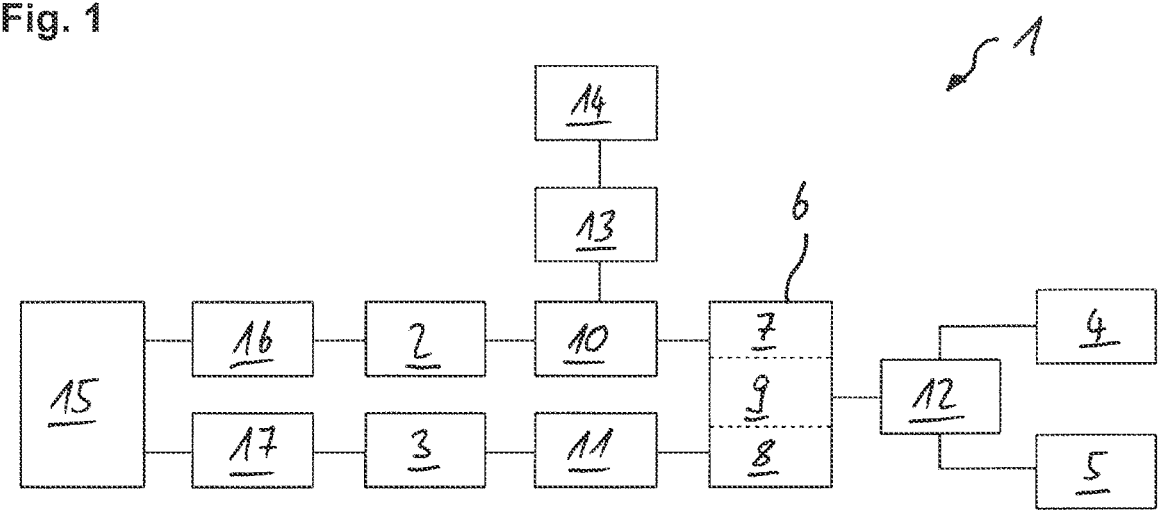
FIG. 1 shows a block diagram of an electric driveline according to an example.

The electric driveline 1 shown in FIG. 1 comprises a first electric machine 2, a second electric machine 3, a first output 4, a second output 5, and a first planetary gear set 6. The first planetary gear set includes three drivingly connected components (first component 7, second component 8, third component 9), wherein the three components are a sun gear, a planetary gear, and a ring gear. The outputs 4, 5 are mechanical outputs.

The first and the second electric machine 2, 3 are drivingly connected or connectable with the first and the second output 4, 5 via the first planetary gear set 6. For instance, the first electric machine 2 is connected with the first planetary gear set 6 via a first gear train 10, the second electric machine 3 is connected with the first planetary gear set 6 via a second gear train 11, and each of the first and second output 4, 5 is connected with the first planetary gear set 6 via a third gear train 12.

The first gear train 10 comprises at least two different, selectively engageable gear ratios, such that the first electric machine 2 is selectively drivingly connected or connectable with the first component 7 of the first planetary gear set 6 via at least two different gear ratios.

The second gear train 11 comprises at least two different, selectively engageable gear ratios, such that the second electric machine 3 is selectively drivingly connected or connectable with the second component 8 of the first planetary gear set 6 via at least two different gear ratios.

According to the present example, each of the first and the second electric machine 2, 3 is thus drivingly connected or drivingly connectable with the first planetary gear set 6 via at least two different gear ratios. Alternatively, only one of the first and the second electric machine 2, 3 may be selectively drivingly connected or drivingly connectable with the first planetary gear set 6 via at least two different gear ratios. In this case, the remaining one of the first and the second electric machine 2, 3 may be coupled to the first planetary gear 6 set directly or via one or more fixed gear ratios.

Alternatively or additionally to at least one of the first and the second electric machine 2, 3 being selectively connected or connectable with the first planetary gear 6 as described, the third component 9 of the first planetary gear set 6 may be selectively drivingly connected or connectable with each of the first and the second output 4, 5 via at least two different gear ratios. In the present example, the third gear train 12 comprises at least two different, selectively engageable gear ratios, such that the third component 9 of the first planetary gear set 6 is selectively drivingly connected or connectable with each of the first and the second output 4, 5 via at least two different gear ratios.

According to the foregoing, each of the first and the second electric machine 2, 3 is drivingly connected or drivingly connectable with a different one of the three components 7, 8, 9 of the first planetary gear set 6, and each of the first and the second output 4, 5 is drivingly connected or drivingly connectable with the remaining one of the three components 7, 8, 9 of the first planetary gear set 6.

The electric driveline 1 comprises a mechanical power take-off 13 drivingly connected or selectively drivingly connected with the first electric machine 2 via the first gear train 10. The power take-off 13 is connected to a third output 14 (mechanical output).

The electric driveline 1 further comprises an energy storage device 15, such as a rechargeable battery, electrically connected with the first electric machine 2 via a first motor control unit 16 and with the second electric machine 3 via a second motor control unit 17. The first and second motor control units 16, 17 are configured to supply and control the first and second electric machine 2, 3 respectively.

The first electric machine 2 and/or the second electric machine 3 may be configured to selectively operate as either one of an electric motor and an electric generator.

Figure 2:
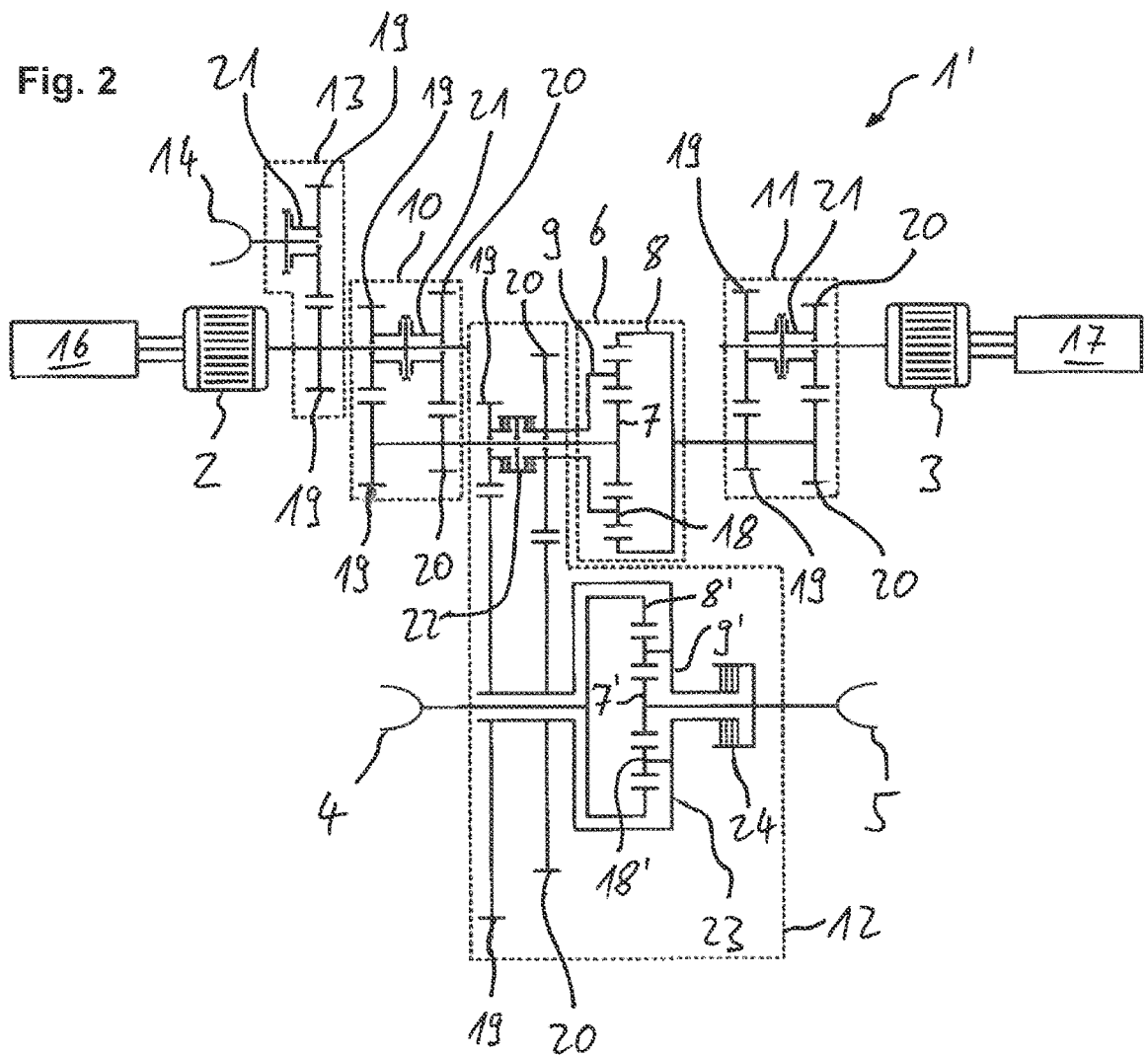
FIG. 2 shows a schematic view of an electric driveline according to a further example.

The electric driveline 1' shown in FIG. 2 is configured similarly to the electric driveline 1. It comprises a first electric machine 2, a second electric machine 3, a first output 4, a second output 5, a third output 14, a first planetary gear set 6, a first gear train 10, a second gear train 11, a third gear train 12, a mechanical power take-off 13, an energy storage device (not shown), a first motor control unit 16, and a second motor control unit 17, arranged and configured as described above.

The first and second electric machine 2, 3 are electric machines of an electric vehicle. The first and second output 4, 5 are part of the vehicle's tractive driveline; such as, the first output 4 is a rear output drivingly connected with a rear drive axle of the vehicle, the second output 5 is a front output drivingly connected with a front drive axle of the vehicle. The first and/or second output 4, 5 may be other types of mechanical outputs of the vehicle.

The first planetary gear set 6 comprises a sun gear as a first component 7, a ring gear as a second component 8, and a planetary carrier as a third component 9. The planetary carrier 9 of the first planetary gear set 6 comprises a plurality of planetary gears 18 meshing with the sun gear 7 and the ring gear 8.

Each of the first gear train 10, the second gear train 11, and the third gear train 12 comprises a set of first gears 19 providing a first gear ratio and a set of second gears 20 providing a second gear ratio.

Each of the first and second gear train 10, 11 further comprises two dog clutches 21 configured to selectively drivingly connect the first gears 19 or the second gears 20 of the respective gear train 10, 11 with the sun gear 7 and the ring gear 8, respectively, of the first planetary gear set 6.

The first electric machine 2 is thus selectively drivingly connectable with the sun gear 7 of the first planetary gear set 6 via the first and second gear ratio of the first gear train 10. The second electric machine 3 is selectively drivingly connectable with the ring gear 8 of the first planetary gear set 6 via the first and second gear ratio of the second gear train 11.

The third gear train 12 comprises two wet clutches 22 configured to selectively drivingly connect the first gears 19 or the second gears 20 of the third gear train 12 with the planetary carrier 9 of the first planetary gear set 6. The first and second output 4, 5 are thus selectively drivingly connectable with the planetary carrier 9 of the first planetary gear set 6 via the first and second gear ratio of the third gear train 12.

The dog clutches 21 and the wet clutches 22 of the present example may be replaced, in different examples, by other technologies such as dog clutches and/or wet clutches and/or synchronizers.

In the present example, a first input of the first planetary gear set 6 includes the sun gear 7, a second input of the first planetary gear set 6 includes the ring gear 8, and an output of the first planetary gear set 6 includes the planetary carrier 9. Alternatively, the first and/or second input and/or the output of the first planetary gear set 6 may include any other one of the sun gear 7, the ring gear 8, and the planetary carrier 9.

The third gear train 12 comprises a second planetary gear set 23 including a sun gear 7' as a first component, a ring gear 8' as a second component, and a planetary carrier 9' as a third component. The planetary carrier 9' of the second planetary gear set 23 comprises a plurality of planetary gears 18' meshing with the sun gear 7' and the ring gear 8'.

The first planetary gear 6 set is drivingly connectable with the first and the second output 4, 5 via the second planetary gear set 23. For instance, the first output 4 is drivingly connected with the ring gear 8', the second output 5 is drivingly connected with the sun gear 7', and the planetary carrier 9' of the second planetary gear set 23 is selectively drivingly connectable with the planetary carrier 9 of the first planetary gear set 6 via the first and second gears 19, 20 of the third gear train 12.

The second planetary gear set comprises a locking mechanism 24 selectively engageable to directly drivingly connect the first output 4 and the second output 5 (for instance, to respond to variable traction and/or road conditions). The locking mechanism 24 may be omitted. Alternatively, the first and second output 4, 5 may be connected via a bevel gear IAD and/or a front-axle disconnect and/or a rear-axle disconnect.

The mechanical power take-off 13 comprises a set of first gears 19 drivingly connected with the first electric machine 2. The first gears 19 of the power take-off 13 are selectively drivingly connectable to the third output 14 (mechanical output) via a dog clutch 21 of the power take-off 13. The third output 14 may be, for instance, an auxiliary mechanical output of the electric vehicle.

In the following, a method of operating an electric driveline, such as the electric driveline 1 or 1', is described. Torque is transmitted from the first electric machine 2 and from the second electric machine 3 to the first mechanical output 4 and to the second mechanical output 5 via the first planetary gear set 6.

Torque from at least one of the first electric machine 2 and the second electric machine 3 is selectively transmitted to one of the three components 7, 8, 9 of the first planetary gear 6 set via one of at least two selectively engageable gear ratios (in this example, via one of the at least two selectively engageable gear ratios of the first and/or second gear train 10, 11).

Additionally or alternatively to the preceding paragraph, torque from the first planetary gear set 6 is selectively transmitted to each of the first output 4 and the second output 5 via one of at least two selectively engageable gear ratios (in this example, via one of the at least two selectively engageable gear ratios of the third gear train 12).

If torque from only one of the first and the second electric machine 2, 3 is selectively transmitted to the first planetary gear set 6 via one of at least two different gear ratios, torque from the remaining one of the first and the second electric machine 2, 3 may be transmitted to the planetary gear set 6 directly or via one or more fixed gear ratios.

Furthermore, torque from at least one of the first output 4 and the second output 5 may be transmitted to the first electric machine 2 and the second electric machine 3 via the planetary gear set 6.

In the configuration above, the first electric machine 2 may be connected to the planetary gear set 6 via multiple gear ratios, the second electric machine 3 may be connected to the planetary gear set 6 via multiple gear ratios, and the planetary gear set 6 may be connected to the outputs via multiple gear ratios. The many different combinations of gear ratios that may be selected provide a highly variable transmission of power. This high level of variation allows for the electric machines to operate at their optimal operational points and also prevents circumstances when electric machines cannot be operated within their operational parameters. For example, an electric machine may be optimized for low speed parameters. In a conventional configuration the low speed electric machine may not be operated at highway speed whereas in the configuration disclosed herein the highly variable transmission may allow for the low speed electric machine to be operated at highway speed.

Furthermore, the transmission is provided in a compact and space efficient manner. The configuration described above utilizes a planetary gear set and several two speed gear trains. This configuration may replace conventional transmissions which require many gears within single gear box with a single input and output.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE NUMERALS 1, 1' Electric driveline,
2 First electric machine,
3 Second electric machine,
4 First output,
5 Second output,
6 First planetary gear set,
7 First component,
8 Second component,
9 Third component,
10 First gear train,
11 Second gear train,
12 Third gear train,
13 Power take-off,
14 Third output,
15 Energy storage device,
16 First motor control unit,
17 Second motor control unit,
18, 18' Planetary gear,
19 First gear,
20 Second gear,
21 Dog clutch,
22 Wet clutch,
23 Second planetary gear set,
24 Locking mechanism.

The invention claimed is:
1. An electric driveline, comprising:
at least a first electric machine and a second electric machine,
at least a first output and a second output,
at least a first planetary gear set comprising three components including a sun gear, a planetary carrier, and a ring gear, the first planetary gear set connecting the first electric machine and the second electric machine to the first output and the second output, a first gear train selectively inputting torque of the first electric machine to a first component of the first planetary gear set via at least two different gear ratios, a second gear train selectively outputting torque from a second component of the first planetary gear set to each of the first output and the second output via at least two different gear ratios, and a third gear train selectively inputs torque from the second electric machine to a third component of the first planetary gear set via at least two different gear ratios.

2. The electric driveline of claim 1, wherein the second gear train inputs torque from the first planetary gear set to a secondary planetary gear set, and the second planetary gear set outputs torque to the first output and the second output.

3. The electric driveline of claim 2, wherein the second planetary gear set comprises three components of a second sun gear, a second planetary carrier, and a second ring gear, and wherein the first output and the second output are each connected with different ones of the three components of the second planetary gear set.

4. The electric driveline of claim 2, wherein the second planetary gear set comprises a locking mechanism.

5. The electric driveline of claim 1, further comprising a mechanical power take-off connected or selectively connected with one of the first electric machine and the second electric machine.

6. The electric driveline of claim 1, wherein a drive axle is connected with the first output and a second drive axle is connected with the second output.

7. The electric driveline of claim 1, further comprising an energy storage device electrically connected with the first electric machine and/or with the second electric machine, and wherein the first electric machine and/or the second electric machine are/is configured to selectively operate as either one of an electric motor and an electric generator.

8. A method of operating an electric driveline, comprising:

transmitting torque from a first electric machine and from a second electric machine to a first output and to a second output via a first planetary gear set, the first planetary gear set including three components including a sun gear, a planetary carrier, and a ring gear, selectively transmitting torque from the first electric machine to a first component of the three components of the first planetary gear set via one of at least two selectively engageable gear ratios of a first gear train, selectively transmitting torque from a second component of the three components of the first planetary gear set to the first output and the second output via one of at least two selectively engageable gear ratios of a second gear train, and transmitting torque from the second electrical machine to a third component of the first planetary gear set via one of at least two selectively engageable gear ratios of a third gear train.

9. The method of claim 8, wherein torque from at least one of the first output and the second output is transmitted to the first electric machine and the second electric machine via the first planetary gear set.

10. The method of claim 8, wherein the first component is the ring gear, the second component is the sun gear, and the third component is the planetary carrier.

11. An electric driveline, comprising:
at least a first electric machine and a second electric machine,
at least a first output and a second output,
at least a first planetary gear set comprising three components including a sun gear, a planetary carrier, and a ring gear, the first planetary gear set connecting the first electric machine and the second electric machine to the first output and the second output,
a first gear train selectively inputting torque of the first electric machine to a first component of the first planetary gear set via at least two different gear ratios, and
a second gear train selectively outputting torque from a second component of the first planetary gear set to each of the first output and the second output via at least two different gear ratios
wherein the first component is the ring gear, the second component is the sun gear, and a third component is the planetary carrier.

* * * * *